United States Patent
Inoue et al.

(10) Patent No.: US 7,022,176 B1
(45) Date of Patent: Apr. 4, 2006

(54) CARBON BLACK FOR COLORING CEMENT AND METHOD FOR COLORING CEMENT-FORMED PRODUCT

(75) Inventors: Daisuke Inoue, Tokyo (JP); Hidetake Sakurai, Tokyo (JP); Masato Wake, Tokyo (JP); Toshiji Ikeshima, Tokyo (JP)

(73) Assignees: Tokai Carbon Co., Ltd., Tokyo (JP); Telnite Co., Ltd., Tokyo (JP); Tokyo Zairyo Co., Ltd., Tokyo (JP); Toteku Co., Ltd., Tokyo (JP)

( * ) Notice: Subject to any disclaimer, the term of this patent is extended or adjusted under 35 U.S.C. 154(b) by 0 days.

(21) Appl. No.: 10/168,476

(22) PCT Filed: Dec. 22, 1999

(86) PCT No.: PCT/JP99/07247

§ 371 (c)(1),
(2), (4) Date: Sep. 23, 2002

(87) PCT Pub. No.: WO01/46322

PCT Pub. Date: Jun. 28, 2001

(51) Int. Cl.
C09C 1/48 (2006.01)

(52) U.S. Cl. .................................. 106/474; 106/476
(58) Field of Classification Search ................. 106/474, 106/476
See application file for complete search history.

(56) References Cited

FOREIGN PATENT DOCUMENTS

JP  3-263471  * 11/1991

OTHER PUBLICATIONS

English translation of Japanese Published Unexamined Patent Publication S59-100168, Tsubushi et al., Jun. 9, 1984.*

* cited by examiner

*Primary Examiner*—Elizabeth D. Wood
(74) *Attorney, Agent, or Firm*—Flynn, Thiel, Boutell & Tanis, P.C.

(57) ABSTRACT

The present invention provides a carbon black for coloring cement excelling in dispersibility in cement slurry, exhibiting superior adhesion to a cement matrix, and excelling in coloring characteristics and strength, and a method for coloring a cement-formed product using the carbon black. The carbon black for coloring cement is a carbon black in which humic acids are adsorbed on the surface by a surface treatment using an aqueous solution in which the humic acids are dissolved. The carbon black is preferably a carbon black on which humic acids are adsorbed by wet-granulation and drying using an aqueous solution in which the humic acids are dissolved as granulation water. The coloring method includes adding and mixing a water suspension in which carbon black, on which the humic acids are adsorbed, is dispersed in water with cement slurry, or directly adding and mixing carbon black on which the humic acids are adsorbed with the cement slurry, thereby coloring a cement-formed product.

5 Claims, No Drawings

CARBON BLACK FOR COLORING CEMENT AND METHOD FOR COLORING CEMENT-FORMED PRODUCT

BACKGROUND OF THE INVENTION

1. Field of the Invention

The present invention relates to carbon black for coloring cement which is suitable for coloring a cement-formed product in black, and to a method for coloring a cement-formed product using the carbon black.

2. Description of Background Art

As a coloring agent for coloring various types of cement-formed products used for buildings, inorganic and organic pigments have been conventionally used. As black pigments, iron oxide (iron black) and carbon black are used.

Iron oxide has good coloring characteristics, but exhibits poor corrosion resistance, in particular, inferior acid resistance. For example, iron oxide is easily discolored due to acid rain or the like, thereby causing a decrease in weatherability of the cement-formed product. Moreover, it is necessary to mix a large amount of iron oxide with the cement-formed product in order to increase the degree of blackness. As a result, the amount of water to be added when mixing a dispersion solution of iron oxide with cement slurry is also increased, whereby the strength of the cement-formed product is decreased.

On the contrary, carbon black is not discolored due to acid rain or the like, thereby differing from iron oxide. Moreover, since the carbon black has good coloring characteristics, it suffices to mix only a small amount of carbon black with cement components. For example, Japanese Patent Application Laid-open No. 3-60483 discloses a cement-formed product in which the surface of a formed product obtained by forming a cement forming material including a black coloring agent is covered with a black coating film. This application discloses carbon black as the black coloring agent.

However, since the carbon black has low dispersibility in water because of its surface characteristics, it is very difficult to homogeneously and stably disperse the carbon black in the cement slurry. Moreover, since the carbon black is in the form of very minute powder, the carbon black inhibits the hardening of the cement. Furthermore, the carbon black separates from the cement matrix after hardening with the passage of time due to low adhesion to a cement matrix. This causes a decrease in the strength of the cement-formed product.

SUMMARY OF THE INVENTION

In order to solve the above problems, the present inventors have conducted extensive studies on means to improve the dispersibility of the carbon black in the cement components. As a result, the present inventors have found that dispersibility in the cement slurry and adhesion to the cement matrix can be improved by modifying the surface characteristics of the carbon black by causing humic acids to be adsorbed on the surface.

The present invention has been achieved based on this finding. An object of the present invention is to provide carbon black for coloring cement excelling in dispersibility in the cement slurry, exhibiting superior adhesion to the cement matrix, and excelling in coloring characteristics and strength of the cement-formed product, and a method for coloring a cement-formed product.

In order to achieve the above object, the present invention provides carbon black for coloring cement in which humic acids are adsorbed on the surface thereof by a surface treatment using an aqueous solution in which the humic acids are dissolved.

A method for coloring a cement-formed product of the present invention comprises adding and mixing a water suspension in which carbon black on which humic acids are adsorbed is dispersed in water with cement slurry. Another coloring method comprises adding and mixing carbon black on which humic acids are adsorbed with a cement slurry.

DETAILED DESCRIPTION OF THE PREFERRED EMBODIMENT

There are no specific limitations to the carbon black utilized in the present invention. In practice, furnace black produced using an oil furnace process is used. Use of furnace black with a nitrogen adsorption specific surface area ($N_2SA$) of 300 $m^2/g$ or less is preferable.

The humic acids which are adsorbed on the surface of the carbon black to modify the surface characteristics include humic acid, humates, and salts of derivatives of the humic acid. Specifically, the humic acids refer to at least one of (1) humic acid extracted with an alkaline aqueous solution from low-rank coals or a product obtained by oxidation degradation of low-rank coals using an oxidizing agent, and separated by sedimentation by the addition of an acidic aqueous solution, (2) salts in which the humic acid is combined with an alkaline metal, ammonium, or a cation with a valence of two or more, and (3) alkaline metal salts or ammonium salts of derivatives obtained by polycondensation of the humic acid and aldehydes, amines, or phenols.

As examples of the oxidizing agent used for oxidation degradation, air, oxygen, ozone, hydrogen peroxide, nitrous acid, nitric acid, permanganates, chromates, dichromates, and the like can be given. As examples of the acidic aqueous solution, an aqueous solution of mineral acids such as hydrochloric acid, nitric acid, or sulfuric acid or water-soluble organic acids such as formic acid, acetic acid, or oxalic acid can be given.

The humic acids also includes humic acid extracted from soil with an alkaline aqueous solution and separated by sedimentation by the addition of an acidic aqueous solution. The chemical structure of the humic acids has not been identified. The humic acids are generally defined as amorphous polymer organic acids which are insoluble in an acidic aqueous solution, but soluble in an alkaline aqueous solution.

Humates are salts in which the humic acid is combined with an alkaline metal, ammonium, or a cation with a valence of two or more. As the alkaline metal, potassium and sodium are preferable. As the cation with a valence of two or more, ions of metals such as alkaline earth metals, zinc, copper, nickel, cobalt, iron, manganese, chromium, and aluminum can be given. Of these, ions of magnesium, calcium, iron, copper, and aluminum are preferable.

As examples of the salts of the derivatives of the humic acid, alkaline metal salts or ammonium salts of the derivatives of the humic acid obtained by polycondensation of the humic acids and aldehydes, amines, or phenols can be given.

As examples of aldehydes for forming the derivatives of the humic acid, formaldehyde, acetoaldehyde, propionaldehyde, isobutyl aldehyde, and the like can be given. Of these, formaldehyde and acetoaldehyde are preferable. As examples of amines for forming the derivatives of the humic acid, ammonia, methylamine, ethylamine, n-butylamine, isobutylamine, and the like can be given. Of these, methylamine and ethylamine are preferable. As examples of phenols for forming the derivatives of the humic acid, phenol, methylphenol, methoxyphenol, halogenated phenol, nitrophenol, and the like can be given. Of these, phenol, methylphenol, and methoxyphenol are preferable.

Of the above humic acids, humic acid is used as an acidic substance, and humates and salts of the derivatives of the humic acid are used as alkaline substances.

The carbon black for coloring cement of the present invention is surface-treated using an aqueous solution in which the humic acids are dissolved, wherein the humic acids are adsorbed on the surface. The surface treatment is performed as follows, for example. Carbon black powder is added to a humic acid aqueous solution. The mixture is fully mixed by stirring to prepare a uniformly dispersed suspension. The carbon black is separated by filtration and dried. This causes the humic acids to be adsorbed on the surface of the carbon black.

In order to cause the humic acids to be adsorbed on the surface of the carbon black at a specific ratio, to efficiently perform the surface treatment, and to efficiently color the cement-formed product using the carbon black, it is preferable to prepare a carbon black granulated product on which the humic acids are adsorbed by performing granulation and drying using an aqueous solution in which the humic acids are dissolved as granulation water using a conventional wet granulating machine. The carbon black granulated product may be used in an undried state.

The concentration of the humic acid aqueous solution is preferably about 0.5–30 wt %. The amount of humic acids adsorbed on the carbon black is preferably 1–30 wt % with respect to the carbon black.

A method for coloring a cement-formed product of the present invention using the carbon black for coloring cement of the present invention, in which the humic acids are adsorbed on the surface, comprises adding and mixing a water suspension in which the carbon black on which the humic acids are adsorbed is dispersed in water with cement slurry. Another coloring method comprises adding and mixing the carbon black on which the humic acids are adsorbed with cement slurry.

A cement-formed product is obtained by adding aggregates, admixtures, and the like to cement components such as ordinary Portland cement, high-early-strength Portland cement, or blast-furnace cement, kneading the mixture with water to prepare cement slurry, pouring the cement slurry into a specific form, and allowing the cement slurry to harden. As the aggregates, river sand, river gravel, crushed sand, crushed stone, artificial light-weight aggregate, and the like are used. As the admixtures, a water-reducing agent, AE water-reducing agent, cement admixture polymer, and the like are used. The mix proportion of each material may be the same as that of generally used cement paste, cement mortar, cement concrete, and the like.

The cement-formed product is colored by adding and mixing a water suspension, in which the carbon black for coloring cement of the present invention on which the humic acids are adsorbed is dispersed in water, with cement slurry obtained by kneading the above material components with water at a specific ratio to prepare carbon black dispersion cement slurry, and forming and curing the cement slurry according to a conventional method.

However, in the case of adding the carbon black water suspension to the cement slurry, since the slurry concentration is diluted by the addition of the suspension, it is necessary to set the concentrations of the slurry and suspension at relatively large values. This may hinder uniform dispersion and maintenance of the mixed state.

In this case, carbon black powder is wet-granulated using an aqueous solution in which the humic acids are dissolved at a specific concentration as the granulation water and dried to prepare carbon black in which the humic acids are adsorbed on the surface. The cement-formed product is colored by directly adding and mixing the carbon black with the cement slurry. According to this method, the amount of the humic acids adsorbed can be adjusted by controlling the weight ratio of the carbon black powder to the granulation water (granulation water content) during wet granulation or the concentration of the humic acids in the granulation water. Therefore, operations such as control of the adsorption amount of the humic acids and addition and mixing with the cement slurry can be efficiently performed with high accuracy.

The carbon black on which the humic acids are adsorbed is preferably added to the cement slurry in an amount of 0.1–20 wt % for 100 wt % of the solid content in the cement slurry. If the amount is less than 0.1 wt %, sufficient coloring effect may not be obtained. If the amount exceeds 20 wt %, forming may become difficult and the strength of the cement-formed product may be decreased.

Since the carbon black for coloring cement of the present invention is surface-treated using a humic acid aqueous solution, in which the humic acids are adsorbed on the surface, dispersibility of the carbon black in the cement slurry is remarkably improved. Moreover, the carbon black exhibits improved adhesion to the cement matrix. This prevents separation and removal of the carbon black for coloring from the cement-formed product, whereby a decrease in material strength can be prevented. Since the carbon black of the present invention exhibits no discoloration caused by acid rain, thereby differing from iron oxide, the carbon black does not cause a decrease in weatherability of the cement-formed product.

The method for coloring a cement-formed product of the present invention comprises adding and mixing a water suspension of the above carbon black for coloring cement with cement slurry, or directly adding and mixing the above carbon black with cement slurry. Therefore, a specific amount of carbon black for coloring can be mixed without causing a decrease in the cement matrix concentration in the cement slurry. Therefore, the degree of blackness of the cement-formed product can be easily adjusted.

EXAMPLES

The present invention is described below in detail by examples and comparative examples.

(Preparation of Water Suspension of Humic Acid-Adsorbed Carbon Black)

Humic acid ("CH-02" manufactured by Telnite Co., Ltd.) was dissolved in water to prepare a humic acid aqueous solution at a concentration of 5 wt %. Carbon black ("Seast 3" manufactured by Tokai Carbon Co., Ltd.) was added to the humic acid aqueous solution while changing the amount ratio. The carbon black was mixed and dispersed using a homogenizer to prepare water suspensions of the humic acid acid-adsorbed carbon black. The carbon black was added to 500 g portions of the humic acid aqueous solution in amounts of 500 g, 250 g, and 125 g so that the adsorption amount of the humic acid was 5 wt %, 10 wt %, and 20 wt % respectively for 100 wt % of the carbon black. Water was added to the mixture in amounts of 1625 g, 625 g, and 25 g, respectively, so that the water suspension concentration was 20 wt %. Three types of water suspensions of the humic acid-adsorbed carbon black shown in Table 1 were thus prepared.

TABLE 1

| Water suspension sample No. | Humic acid (g) | Carbon black (g) | Water (g) | Water suspension concentration (wt %) | Adsorption amount of humic acid (wt %) |
|---|---|---|---|---|---|
| 1 | 25 | 500 | 2100 | 20 | 5 |
| 2 | 25 | 250 | 1100 | 20 | 10 |
| 3 | 25 | 125 | 500 | 20 | 20 |

Example 1

40 parts by weight of water was mixed with 100 parts by weight of ordinary Portland cement and 200 parts by weight of silica sand No. 6 (produced in Yamagata prefecture) to prepare cement slurry. A water suspension sample No. A shown in Table 1 was added and mixed with the cement slurry in amounts of 1.5, 3, 6, and 9 parts by weight respectively as the solid content. The mixed slurry was poured into forms and formed at a dimension of 40×40×160 mm. The formed slurry was cured in a wet atmosphere at a temperature of 20° C. and a humidity of 80% for two days and in water at 20° C. for 28 days to obtain cement-formed products colored black.

Example 2

Cement-formed products colored black were obtained using the same method as in Example 1 except for using a water suspension sample No. B shown in Table 1.

Example 3

Cement-formed products were obtained using the same method as in Example 1 except for adding carbon black not having the humic acid adsorption treatment ("Seast 3" manufactured by Tokai Carbon Co., Ltd.) to the cement slurry in place of the water suspension sample No. A in amounts of 1.5 and 3 parts by weight.

The preparation conditions for these cement-formed products are shown in Tables 2 and 3.

TABLE 3

| | | Comparative Example 1 | Comparative Example 2 | | Comparative Example 3 | |
|---|---|---|---|---|---|---|
| | | 1 | 1 | 2 | 1 | 2 |
| Cement composition (part by weight) | Cement | 100 | 100 | 100 | 100 | 100 |
| | Silica sand No. 6 | 200 | 200 | 200 | 200 | 200 |
| | Water | 40 | 40 | 40 | 40 | 40 |
| | Humic acid adsorbed carbon black | — | *1 Solid content 9 | *1 Solid content 15 | *2 Solid content 1.5 | *2 Solid content 3 |

Note:
*1 Bayer 318 was used as a pigment in place of humic acid adsorbed CB
*2 Seast 3 was used as a pigment in place of humic acid adsorbed CB Example 4

Humic acid ("CH-02" manufactured by Telnite Co., Ltd.) was dissolved in water to prepare a humic acid aqueous solution. Carbon black ("Seast 3" manufactured by Tokai Carbon Co., Ltd.) was wet-granulated using the humic acid aqueous solution as granulation water. The concentration of the humic acid aqueous solution and the granulation water content were adjusted at the time of granulation so that the adsorption amount of the humic acid was 20 wt % for 100 wt % of the carbon black. The carbon black was dried at a temperature of 110° C. for 24 hours using a dryer to prepare carbon black on which the humic acid was adsorbed. This humic acid-adsorbed carbon black was directly added and mixed with cement slurry prepared using the same method as in Example 1 in amounts of 1.5, 3, 6, and 9 parts by weight. Cement-formed products were obtained using the mixed slurry using the same method as in Example 1.

The properties of the cement-formed products thus obtained were measured using the following methods. The results are shown in Table 4.

(1) Brightness (L*)

Brightness was measured using a chromameter ("CR-200" manufactured by Minolta Camera Co., Ltd.). The smaller the value of the brightness, the greater the degree of coloration (black) of the cement-formed product.

(2) Bending Strength (MPa)

Bending strength was measured using an Instron universal tester at a cross head rate of 0.1 mm/min. using a central concentrated loading method (span: 100 mm).

TABLE 2

| | | Example 1 | | | | Example 2 | | | | Example 3 | | | |
|---|---|---|---|---|---|---|---|---|---|---|---|---|---|
| | | 1 | 2 | 3 | 4 | 1 | 2 | 3 | 4 | 1 | 2 | 3 | 4 |
| Cement composition (part by weight) | Cement | 100 | 100 | 100 | 100 | 100 | 100 | 100 | 100 | 100 | 100 | 100 | 100 |
| | Silica sand No. 6 | 200 | 200 | 200 | 200 | 200 | 200 | 200 | 200 | 200 | 200 | 200 | 200 |
| | Water | 40 | 40 | 40 | 40 | 40 | 40 | 40 | 40 | 40 | 40 | 40 | 40 |
| | Humic acid adsorbed carbon black | Water suspension No. A Solid content | | | | Water suspension No. B Solid content | | | | Water suspension No. C Solid content | | | |
| | | 1.5 | 3 | 6 | 9 | 1.5 | 3 | 6 | 9 | 1.5 | 3 | 6 | 9 |

(3) Compressive Strength (MPa)

Compressive strength was measured according to JIS R5201.

TABLE 4

|  |  | Brightness (L*) | Bending strength (MPa) | Compressive strength (MPa) |
|---|---|---|---|---|
| Example 1 | 1 | 58.22 | 9.3 | 54.2 |
|  | 2 | 54.80 | 9.5 | 53.2 |
|  | 3 | 52.00 | 9.6 | 52.3 |
|  | 4 | 50.90 | 9.5 | 51.5 |
| Example 2 | 1 | 57.88 | 9.0 | 54.1 |
|  | 2 | 53.84 | 9.3 | 55.3 |
|  | 3 | 51.36 | 9.4 | 55.0 |
|  | 4 | 49.92 | 9.5 | 54.0 |
| Example 3 | 1 | 57.54 | 9.1 | 51.1 |
|  | 2 | 54.17 | 9.5 | 55.0 |
|  | 3 | 51.66 | 9.7 | 53.1 |
|  | 4 | 49.66 | 9.6 | 52.4 |
| Comparative Example 1 | 1 | 74.57 | 9.0 | 50.1 |
| Comparative Example 2 | 1 | 61.75 | 8.4 | 54.0 |
|  | 2 | 58.51 | 8.7 | 51.7 |
| Comparative Example 3 | 1 | 62.14 | 8.8 | 55.0 |
|  | 2 | 58.96 | 8.8 | 49.6 |
| Example 4 | 1 | 57.60 | 9.2 | 51.3 |
|  | 2 | 54.10 | 9.5 | 55.0 |
|  | 3 | 51.56 | 9.6 | 53.2 |
|  | 4 | 49.63 | 9.6 | 52.6 |

As is clear from the results shown in Tables 1 to 4, the cement-formed products obtained by adding and mixing the water suspensions of the humic acid adsorbed carbon black for coloring cement of the present invention with the cement slurry were colored at a high degree of blackness. Moreover, the cement-formed products exhibited high material strength such as bending strength and compressive strength. Therefore, superior coloring effects were obtained in comparison with the comparative examples. This is because the dispersibility in the cement slurry and adhesion to the cement matrix of the carbon black are improved by modifying the surface characteristics of the carbon black by causing the humic acid to be adsorbed. This is apparent from the comparison between Examples 1 to 3 and Comparative Example 3, in which carbon black on which the humic acid was not adsorbed was used. In Example 4, the humic acid-adsorbed carbon black prepared by wet-granulating and drying the carbon black powder using the humic acid aqueous solution as the granulation water was directly added and mixed with the cement slurry. According to Example 4, the adsorption treatment of the humic acid can be performed with high efficiency. Moreover, the cement-formed product can be efficiently colored.

INDUSTRIAL APPLICABILITY

According to the carbon black for coloring cement of the present invention, since the humic acids are adsorbed on the surface of the carbon black, dispersibility of the carbon black in the cement slurry is improved by the adsorbed humic acids. Moreover, adhesion to the cement matrix is also improved. Therefore, according to the method for coloring a cement-formed product of the present invention which comprises adding and mixing the carbon black with cement slurry, a cement-formed product colored at a high degree of blackness, exhibiting superior coloring effects, and excelling in material strength can be obtained.

Obviously, numerous modifications and variations of the present invention are possible in light of the above teachings. It is therefore to be understood that, within the scope of the appended claims, the invention may be practiced otherwise than as specifically described herein.

The invention claimed is:

1. A carbon black composition consisting of carbon black having at least one member selected from the group consisting of a humic acid and a salt of a humic acid formed from the combination of a humic acid with an alkaline metal, an ammonium cation or a cation having a valence of at least two.

2. The carbon black composition of claim 1, wherein the alkaline metal is potassium or sodium.

3. The carbon black composition of claim 1, wherein the cation having a valence of at least two is an ion of a metal selected from the group consisting of an alkaline earth metal, zinc, copper, nickel, cobalt, iron, manganese, chromium and aluminum.

4. The carbon black composition of claim 1, wherein the at least one member is present in an amount of 1–30 wt. % with respect to the carbon black.

5. The carbon black composition of claim 1, wherein the carbon black has a nitrogen adsorption specific surface area of no greater than 300 $m^2/g$.

* * * * *